April 4, 1961   C. D. MILLER   2,978,059
SPEED REGULATING DEVICE
Filed Aug. 1, 1957   3 Sheets-Sheet 1

INVENTOR.
CARL DAVID MILLER
BY
Jerome R. Cox

April 4, 1961 C. D. MILLER 2,978,059
SPEED REGULATING DEVICE
Filed Aug. 1, 1957 3 Sheets-Sheet 2

INVENTOR.
CARL DAVID MILLER
BY
Jerome R. Cox
ATTORNEY

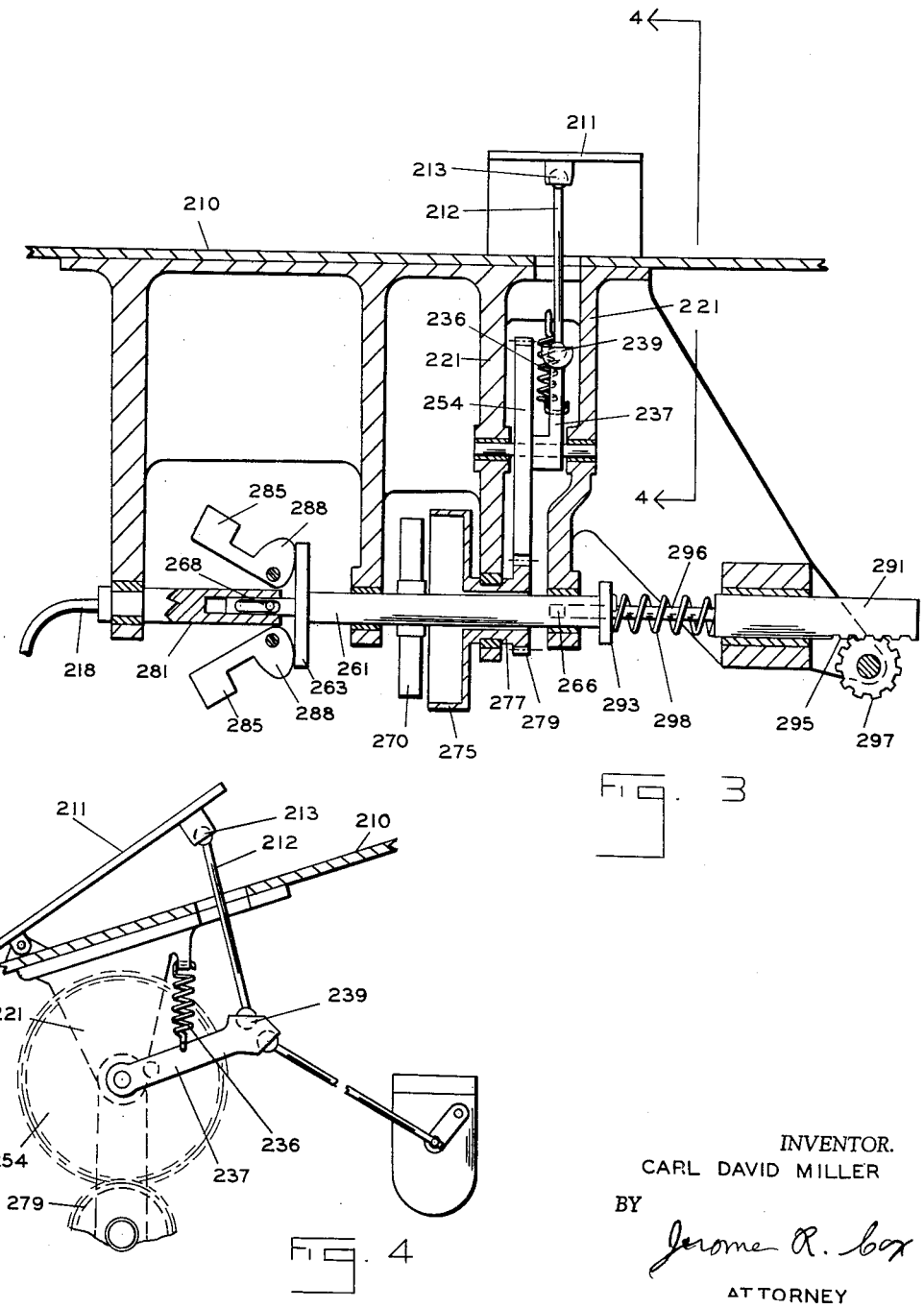

United States Patent Office 2,978,059
Patented Apr. 4, 1961

2,978,059
SPEED REGULATING DEVICE
Carl David Miller, 326 W. 5th Ave., Columbus, Ohio
Filed Aug. 1, 1957, Ser. No. 675,745
14 Claims. (Cl. 180—82.1)

The invention disclosed herein and illustrated in the drawings appended hereto relate to speed regulating devices for effectively limiting the degree to which a throttle or similar velocity controlling device will be advanced toward the maximum velocity position responsive to normal manual or pedal motivation.

Although the device of my invention is equally and readily applicable to any speed control system designed to be manually or pedally actuated, its application in conjunction with the pedal actuated throttle control system now universally employed in automotive vehicles will be described herein for purposes of illustration only, as exemplary of one of the many categories of use in which the device of my invention may be effectively employed.

Experience has demonstrated that the driver of an automotive vehicle must pay close attention to the indicated speed of the vehicle if he is to avoid unconsciously exceeding a statutory or other predetermined maximum speed at which he intends to limit his operation of the vehicle. Governors of various types have been developed and used to automatically limit the speed of a vehicle at predetermined maximum rates. One common form of device in present use for such purposes provides means for restricting absolutely the flow of fuel to the vehicular engine at a predetermined maximum rate, regardless of the actual speed of locomotion of the vehicle. The operation of a vehicle which employs such a device has proven in practice to be most unsatisfactory because the fuel supply which is available for effective acceleration of the engine and the vehicle in response to the demands of the driver is automatically limited either at a predetermined rate of fuel flow or at a predetermined engine fuel supply mixture ratio with no regard for (1) the actual rate of motion of the vehicle, (2) abnormal loading of the engine such as is experienced in ascending a grade or in rapid acceleration of the vehicle from low speeds, or (3) hazardous driving conditions which suddenly require emergency speeds in excess of the predetermined maximum for brief periods of time in order to avoid collision with other moving vehicles.

Other devices now known provide means whereby auxiliary reaction springs are introduced into the accelerator linkage at predetermined throttle positions for automatically adding an additional spring biasing component to the mechanical linkage when the throttle is advanced beyond a predetermined point so as to require additional pressure on the throttle to advance it beyond the predetermined position. While such devices permit further advancement of the throttle after the predetermined position is achieved and thus permit rapid acceleration of the vehicle in emergencies by the exertion of greater pressure on the throttle, the point of automatic control is nevertheless determined by relative positions of components of the mechanical linkage of the throttle with no regard for the actual speed of the vehicle which exists concurrently with the controlling configuration of the throttle mechanism. When such a speed controlling device is adjusted to automatically add additional spring resistance increments at a time when a desired maximum speed is being experienced in a lightly loaded vehicle travelling under zero highway grade conditions, the driver of the vehicle so governed finds that he must then overcome a considerable amount of additional spring resistance if he is to maintain an equivalent maximum vehicular speed while ascending a positive grade. Furthermore such a device so preset will not serve to effect a reduction of speeds in excess of the predetermined maximum speed when the vehicle is descending a negative grade along a highway.

OBJECTS

One of the objects of the invention is to provide novel means for automatically limiting the advancement of a throttle mechanism in response to the actual rate of travel of a vehicle.

A further object of the invention is to provide means for normally limiting the speed of a vehicle in response to the actual vehicular velocity while allowing additional increments of emergency speed or power after the limiting speed is attained.

A further object of the invention is to provide means for automatically limiting vehicular speed at a predetermined rate whereby a further increase in vehicular speed will tend to effect retardation of the throttle and a further reduction in vehicular speed will tend to effect advancement of the throttle.

A further object of the invention is to provide means for substantially maintaining a predetermined vehicular speed without conscious attention by the driver to the indicated speed of the vehicle.

A further object of the invention is to provide means for substantially maintaining a relatively constant rate of vehicular speed regardless of the nature or degree of the grade of a roadway being traversed, and regardless of frequent appreciable changes in the load being transported by or exerted upon the vehicle.

A further object of the invention is to provide means for making available in a governed vehicle additional emergency increments of power or speed in the same manner normally employed in an ungoverned vehicle even after the governed vehicle has attained the maximum speed at which it is governed.

A further object of the invention is to provide means for matching the controlling force naturally exerted by the operator of a vehicle with an equivalent reaction force exerted by a biasing spring only when the vehicle is travelling at a predetermined optimum rate of speed.

A still further object of my invention is to provide throttle governing means whereby speeds exceeding the governed rate may be obtained under emergency conditions but a willful desire of the operator to persistently exceed the governed speed will be defeated by rapid muscular fatigue.

Additional objects and features of the invention will be apparent from the subjoined specification and claims when considered together with the attached drawings.

DRAWINGS

In the drawings which disclose various embodiments of my invention:

Fig. 3 is a side view similar to Fig. 1 showing a third embodiment of my invention; and Fig. 4 is a fragmentary sectional view of the device of Fig. 3 looking at right angles to the view in Fig. 3.

Detailed description

Figure 1:
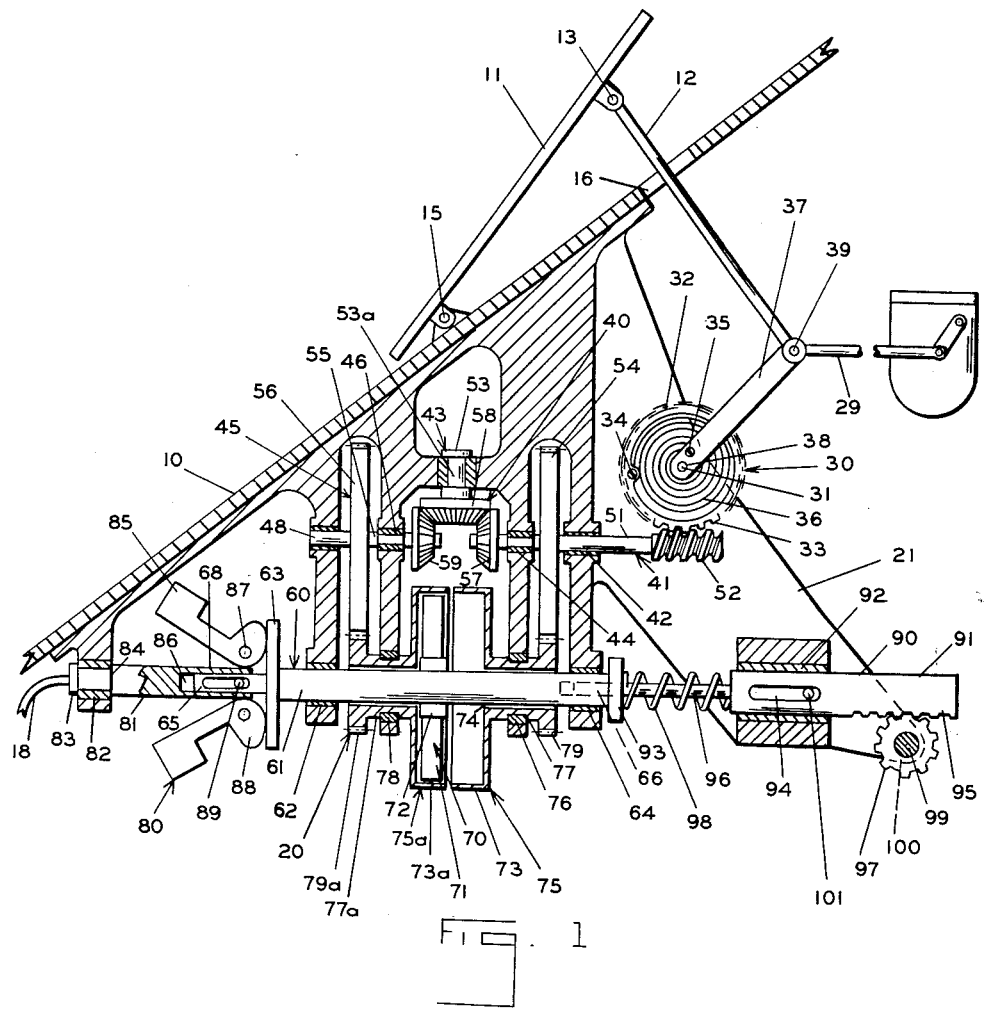
Fig. 1 is a side view, partly in section, showing one embodiment of the invention connected to the pedal accelerator linkage of a conventional automotive vehicle.

Referring to the drawings for a detailed description of the embodiment of my invention which is illustrated in Fig. 1 it may be seen that I have shown the floorboard 10 of a conventional automotive vehicle; a throttle control 11 of the usual pedal accelerator type pivotally secured at one end by suitable means 15 to floorboard 10; and accelerator push rod 12, of well known configuration, pivotally secured by suitable means 13 to the opposite end of control pedal 11, and longitudinally reciprocable within opening 16 of floorboard 10.

The push rod 12 is connected by a link 29 with the carburetor or other speed control device for the automobile. A spring or springs (not shown) may urge the pedal 11 to an idling position.

Means are provided to load the pedal 11 and the rod 12 with additional force urging them to the idling position when the speed of the vehicle exceeds a predetermined limit which limit may be set at any desired point. This means for loading the pedal 11 and rod 12 comprises a spring 36 and means for winding the spring more tightly to cause it to exert additional force on a spring lever 37, the spring lever 37 being connected to the spring 36 and also to the rod 12. The means for winding the spring 36 up include a speedometer cable 18, centrifugal governor means 80, rotatable magnet means 60 and magnet 70, inductor drum 75, drum gear 79, drive gear 54, worm 52, and spring gear 32.

The device is secured by suitable means to the underside of floorboard 10 and is connected in mechanical engagement with push rod 12 and with speedometer cable means 18 of conventional structure.

The device comprises supporting frame 21, variable spring means 30, differential gear means 40, rotatable magnet means 60, inductor drum means 75 and 75a, centrifugal governor means 80 and governor adjusting means 90, each said means being described hereafter in detail.

Supporting frame 21 is formed, preferably from suitable cast materials, with any appropriate configuration such as, for instance, the general configuration shown in Fig. 1 having a suitable pivot pin 31 formed integrally therewith for supporting spring 36, spring gear 32 and lever 37; appropriate bearings 42, 44, 46 and 48 having a common axis aligned perpendicular to a substantially vertical plane passing through the longitudinal axis of said pin 31 for supporting shaft 51 and aligned shaft 55; suitable sleeve bearings 62, 64 and 92 and thrust bearings 76, 78 and 82 having a common axis parallel with the axis of said bearings 42, 44 46 and 48 for supporting rotatable magnet means 60 and governor adjusting means 90; and an appropriate double thrust bearing 100 positioned on an axis perpendicular to and suitably spaced from said axis of bearings 62, 64, 76, 78, 82 and 92 for supporting a shaft 99 subsequently to be described.

Variable spring means 30 comprises spring gear 32, spiral spring 36 and spring lever 37. Spring gear 32 is formed with annularly disposed conventional gear teeth 33 and is pivotally secured by suitable means to pin 31. Spring lever 37 is pivotally secured adjacent one of its ends by suitable means 38 to pivot pin 31 and is similarly secured adjacent its opposite end by suitable means 39 in pivotal engagement with accelerator push rod 12, and link 29. Spiral spring 36 is preferably formed with the spirally wound, flat spring configuration well known in the art. Said spring 36 is disposed concentrically about pin 31, intermediate gear 32 and lever 37 with one of its opposite ends secured by suitable means 34 to gear 32 and the other of its ends secured by similar means 35 to lever 37.

Differential gear means 40 includes worm means 41, idler means 43 and reverse gear means 45. Worm means 41 consists of worm shaft 51, journalled intermediate its opposite ends within thrust bearings 42 and 44 of frame 21; of worm 52, secured on one end of said shaft 51, in meshed engagement with gear 32; of drive gear 54 secured to said shaft 51 intermediate bearings 42 and 44; and of gear 57 preferably of beveled configuration, secured on the opposite end of shaft 51. Idler means 43 consists of shaft 53 journalled adjacent one of its ends in thrust bearing 53a and idler gear 58 secured adjacent its opposite end in meshed engagement with gear 57. Reverse gear means 45 consists of gear shaft 55 with drive gear 56 fixedly secured intermediate its opposite ends, reverse bevel gear 59 similarly secured adjacent one of its ends and meshed with idler gear 58, said shaft 55 being journalled in thrust bearing 48 adjacent one of its ends and in thrust bearing 46 intermediate said gears 56 and 59.

Gears 54, 56, 57, 58 and 59 may be of the conventionally toothed variety, or may be of the frictional or magnetic types well known in the art.

Rotatable magnet means 60 comprises magnet drive shaft 61 and permanent magnet 70. Magnet drive shaft 61 is formed with the generally cylindrical configuration shown in Fig. 1 and is formed integrally with circular flanged portion 63 adjacent one of the opposite ends of said shaft. Shaft 61 is further formed integrally with arbor portion 65 having a general cylindrical configuration and projecting in axial alignment with said flanged end of shaft 61. Arbor portion 65 is preferably formed with a longitudinally disposed slot 68 of suitable configuration for cooperating with spline 89 (described hereafter in detail) and for retaining shaft 61 against rotation independent of centrifugal governor means 80 while permitting shaft 61 to be slidable longitudinally of said governor 80 as will be described hereinafter. Shaft 61 is also formed adjacent to its opposite end with a blind bore 66 in which there fits a spring arbor 96 of a shaft 91 both of which will be later described. Shaft 61 is journalled intermediate its opposite ends in sleeve bearings 62 and 64 of frame 21.

Permanent magnet means 70 is formed with any suitable configuration having an axially disposed sleeve portion 72 and a plurality of individual pole pieces 71 formed integrally with and projecting radially from sleeve portion 72. Sleeve portion 72 of magnet 70 is rigidly secured by suitable means to shaft 60 intermediate the opposite ends of said shaft 60 with sleeve portion 72 axially aligned upon the shaft 60.

Inductor drum means 75 comprises inductor drum 73, drum sleeve 77 and drum gear 79. Drum 73 is formed from suitable magnetic material with the general configuration of a cylinder (as shown in Fig. 1) having one of its ends open and the opposite end substantially closed. Circular opening 74 is centrally disposed in said closed end of cylindrical drum 73 and is formed with a size and shape similar to that of the cross-sectional configuration of drum sleeve 77. Sleeve 77 is formed with the generally cylindrical configuration shown, has an inside diameter appropriate for rendering sleeve 77 slidable upon and rotatable about magnet drive shaft 61, and has an outside diameter suitable for rendering sleeve 77 slidably rotatable within thrust bearing 76 of frame 21. Inductor drum means 75a is similar and has its sleeve rotatable within thrust bearing 78. Drum gear 79 is formed with the general circumferential configuration suitable for cooperatively engaging gear 54 of differential gear means 40 and with an axial bore having substantially the same configuration as opening 74 of inductor drum 73. Gear 79 and inductor drum 73 are fixedly secured to opposite ends of sleeve 77, for mutually rotating with the sleeve about shaft 61 and within thrust bearing 76. Drum means 75a includes an inductor drum 73a, a sleeve 77a and a drum gear 79a. Gear 79a and drum 73a are secured to opposite ends of sleeve 77a for mutually rotating with the sleeve about shaft 61 and within thrust bearing 78.

Drum means 75 and 75a are oppositely disposed intermediate the ends of shaft 61 with the open ends of cylindrical drums 73 and 73a closely adjacent each other, but spaced sufficiently far apart for preventing contact engagement between oppositely disposed annular edges of drums 73 and 73a and for permitting each of drum means 75 and 75a to rotate independently of the other about shaft 61 and within thrust bearings 76 and 78 respectively.

Centrifugal governor means 80 comprises governor shaft 81 and a plurality of centrifugal lever arms 85. Governor shaft 81 is formed with portion 83 having a reduced diameter adjacent one of its ends and with a shoulder 84 intermediate portion 83 and the major diameter portion 81, and is further formed with blind axial bore 86 in communication at its open end with the adjacent end of shaft 61. Spline pin 89 has an outer diameter slightly less than the width dimension of longitudinal slot 68 of magnet drive shaft arbor 65 and is secured by suitable means to shaft 81 transversely of bore 86 for cooperating with said slot 68 and preventing independent rotation of shaft 61 about the common axis of shafts 61 and 81 while permitting arbor 65 to be freely slidable longitudinally of bore 86.

Centrifugal lever arm 85 is formed with balls or weights of suitable configuration adjacent one of its ends, with cam 88 formed adjacent its opposite end and with suitable means 87 for pivotally securing arms 85 to shaft 81. Cam 88 is formed with an appropriate configuration for cooperating with flange 63 and thereby displacing shaft 61 longitudinally of the mutual axis of shafts 81 and 61 by a distance not less than the width dimension of pole pieces 71 of magnet means 70. A plurality of levers 85 are spaced about the outer circumference of governor shaft 81 and are pivotally secured adjacent the end of shaft 81 which includes bore 86, for rotating within respective planes of rotation which lie along and pass radially through the axis of rotation of shaft 81.

Portion 83 of governor means 80 is journalled within bearing 82 of frame 21 and is retained against longitudinal movement in one direction by shoulder 84 bearing upon the inwardly disposed periphery of bearing 82. Shaft 81 is retained against longitudinal motion in the opposite direction by the force of compression spring 98 of governor adjusting means 90 described hereafter.

Governor adjusting means 90 comprises adjusting shaft 91, bearing plate 93, pinion gear 97 and compression spring 98. Adjusting shaft 91 is formed with the configuration shown in Fig. 1 having a suitable spline engaging slot 94 diametrically disposed within shaft 91 adjacent one of its ends. Rack 95 is milled within the circumferential surface of shaft 91 adjacent the end of shaft 91 opposite from slot 94. Spring arbor 96 is formed integrally with shaft 91 and projects from the end of said shaft which lies adjacent slot 94 and is in axial alignment with shaft 91. Bearing plate 93 is formed with a generally circular outer configuration and with a transverse central bore having an inside diameter slightly greater than the outside diameter of spring arbor 96. Governor adjusting spring 98 is a compression spring of well known coiled configuration and is disposed concentric with arbor 96 with one of its ends bearing upon one end of shaft 91 and the opposite end of said spring bearing upon bearing plate 93.

Shaft 91 is slidably secured within sleeve bearing 92 of frame 91 and is retained against rotational movement about the axis of bearing 92 by suitable spline 101.

Pinion gear 97 is formed with the generally circular, peripherally toothed configuration seen in Fig. 1 and is secured by suitable means to axial shaft 99 which is journalled within an appropriate double thrust bearing 100 of frame 21.

Operation

The embodiment of my device shown in Fig. 1 and described in the foregoing specification is used to aid the driver of a vehicle in regulating the speed of the vehicle when assembled in the manner shown as a controlling component of the vehicular throttle regulating system. When the device is so utilized, shaft 99 is rotated by suitable control means located on the instrument panel of the vehicle and suitable flexible shaft connections not shown. Shaft 99 rotates gear 97 which is meshed with rack 95 and thereby slidably repositions governor control shaft 91 longitudinally of bearing 92. Shaft 91 carries with it integral arbor 96 which is slidable longitudinally within the central bore of bearing plate 93 and axial bore 66 of magnet drive shaft 61. Reciprocal longitudinal movement of shaft 91 serves to increase or decrease the distance between the arbor end of shaft 91 and bearing plate 93 and thus serves to increase or decrease the force exerted by compression spring 98 upon bearing plate 93 and upon the bored end of shaft 61 in bearing engagement with, and rotatable upon, one face of plate 93. The direction and degree of rotation of shaft 99 is made by the operator to correspond to the vehicular speed at which it is desired to adjust the device for operating automatically as described hereafter. Since the relationship between any vehicular speed and the biasing force of spring 98 necessary to permit automatic operation of the device upon the occurrence of such vehicular speed will remain constant, the manually adjusting means can be calibrated to permit ready adjustment of the device for automatically operating at a desired predetermined speed limit.

Flexible cable 18 is rotatably driven through well known reducing gear means by the drive shaft of the vehicle in substantially the same manner employed to drive speedometers and tachometers which are connected in meshed engagement with gear means driven by a drive shaft of the vehicle. When the vehicle is in forward motion, it may be assumed that governor means 80 is rotated about the axis of shaft 81 in the counter-clockwise direction when viewed from cable 18. Governor means 80 rotates magnet shaft means 60 which is secured in splined engagement within bore 86 of governor 80. When governor 80 is rotated at speeds well below the automatic controlling rate for which adjusting means 90 has been set, the force of spring 98 bearing upon plate 93 and shaft 61 serves to urge flange 63 toward governor cams 88 and thus to retain weighted arms 85 in a position substantially parallel with the axis of governor shaft 81. When higher vehicular speeds cause governor 80 to be rotated at a faster rate, the weighted ends of arms 85 are urged by centrifugal force to rotate about pivots 87 and arms 85 are urged to move outwardly from shaft 81. Thereby cams 88 are rotated with arms 85 about pivot 87 and bear upon the plane face of flange 63 for urging said flange 63, shaft 61 integral with flange 63, and plate 93 in bearing engagement with the opposite end of shaft 61 axially away from governor means 80 and against the biasing force of compression spring 98. When the rate of rotation of governor 80 is sufficiently high that the effective force exerted by cams 88 upon shaft 61 exceeds the previously adjusted biasing force of spring 98, shaft 61 is slidably repositioned longitudinally toward adjusting means 90.

Magnet means 70 is secured to shaft 61 and is rotated thereby. Depending on the speed, magnet 71 is positioned within one or the other of oppositely disposed inductor drums 75 and 75a. It is moved axially within said drums when shaft 61 is slidably repositioned axially in response to normally occurring imbalance between the force exerted by cams 88 and the oppositely directed force of compression spring 98.

When governor 80 is rotated at relatively low velocities, corresponding to relatively low vehicular speeds, the force exerted by cams 88 upon shaft 61 is less than the opposing force of spring 98 and magnet 70 secured to shaft 61 is rotated within the low-speed inductor drum 73a shown nearest governor means 80 in Fig. 1. When permanent magnet 70 is rotated within drum 73a, eddy currents are induced in drum 73a causing it to rotate in the same direction as magnet 70. Drum 73a rotates with it sleeve 77a fixedly secured to said drum and gear 79a fixedly secured to the opposite end of said sleeve for rotation about shaft 61 and within double thrust bearing 78. Gear 79a drives gear 56 which rotates shaft 55 and bevel gear 59. Gear 59 drives idler gear 58 which in turn drives bevel gear 57, shaft 51 and worm 52 which rotates spring gear 32 in the clockwise direction as viewed in Fig. 1. Clockwise rotation of gear 32 serves to unwind spiral spring 36, which is wound in the counter-clockwise direction about pivot pin 31, and thereby reduces the pressure of spring 32 which normally tends to rotate spring lever 37 in a counter-clockwise direction about pivot 31. Various well known stop means not shown may be employed to secure gear 32 from further rotation in either direction when it has rotated through an arc sufficient for changing the tension of spring 36 by the desired maximum amount.

When the biasing force of spring 36 is thus reduced, pedal 11 is permitted to rotate downwardly about axis 15 under the normal pressure of the driver's foot and thus links 12 and 29, in pivoted mutual engagement at 39, are permitted to move longitudinally in a general downward direction for advancing the throttle setting of the vehicle.

When the vehicle reaches speeds in excess of the predetermined speed at which governor regulating means 90 is adjusted to operate, the effective force exerted by cams 88 against flange 63 and one end of shaft 61 exceeds the opposing force exerted by spring 98 against plate 93 and the opposite end of shaft 61. Shaft 61 and magnet 70 are thereby repositioned axially to a position wherein magnet 70 rotates wholly within the high speed inductor drum 75 shown to the right in Fig. 1. Further rotation of magnet 70 within high speed drum 75 rotates the drum as previously described. Sleeve 77 is rotated with drum 75 within bearing 76 and rotates gear 79, secured to sleeve 77, about shaft 61. Gear 79 drives gear 54 which in turn rotates shaft 51 and worm 52 for rotating spring gear 32 in a counter-clockwise direction. When gear 32 is so rotated, spiral spring 36 is wound more tightly around pin 35 and the upwardly directed force exerted by end 35 of spring 36 upon lever 37 is thereby increased to a value greater than the normal force naturally exerted by the foot of the driver on pedal 11. Rotation of gear means through an arc greater than that necessary to so readjust the biasing force of spring 36 is prevented by suitable stop means previously described, said stop means being arranged to be effective so that full depression of pedal 11 can be achieved in an emergency against a spring biasing force greater than the natural pressure normally exerted by the driver's foot on pedal 11.

When spring 36 is wound as just described, push rod 12 and pedal 11 are rotated upwardly about pivot 15 against the normal force of the driver's foot and connecting link 29 is moved longitudinally for repositioning the throttle of the vehicle to a relatively retarded position.

In the operation of a vehicle which employs the device of my invention, any predetermined normal vehicular speed is constantly held by the driver by simply maintaining a constant normal pressure upon accelerator pedal 11. When the actual speed of the vehicle drops below the desired rate, the device serves to partially reduce the opposing force of the accelerator spring means and to permit the accelerator pedal to be further depressed under normal foot pressure.

When the vehicle is travelling at the preselected optimum speed, magnet 71 is rotated in a plane intermediate drums 73 and 73a, is in register with the annular edge of the cylindrical wall of each drum and exerts an equal magnetic effect on each drum. So long as the vehicular speed remains constant magnet 71 is maintained in the intermediate position and the force tending to rotate either drum is balanced by an equal force tending to rotate the opposite drum and the force exerted by spring 36 is in equilibrium with the force exerted by the driver on pedal 11. When the actual vehicular speed exceeds the predetermined rate, the device serves to automatically increase, within limits, the opposing force of the accelerator spring and to urge the accelerator pedal upwardly toward a reduced throttle position. If the driver attempts to wilfully oppose the upward pressure of the spring as so increased, his foot will soon become naturally fatigued and relax, permitting the accelerator pedal to be moved to a retarded position by spring 36.

The minimum upward pressure exerted by spring 36 is determined by suitable stop means previously described to insure that the biasing force of spring 36 cannot be reduced substantially below that normally encountered in an automotive accelerator. Therefore a driver is not compelled by the device to drive at the preselected optimum speed, but may operate the vehicle in the normal manner at any speed which does not exceed the preselected rate.

In the event that an emergency situation should call for additional speed or additional power beyond that available at the predetermined setting of the device, the accelerator pedal 11 can be fully depressed against the maximum biasing force of spring 36 and can be held in such position for brief periods during which the driver is not apt to experience more than slight discomfort in exerting the additional force required for full depression of the accelerator.

In addition to providing a variable upper speed limit, beyond which the device functions to influence a driver to reduce his speed, if desired, the device may be provided with suitable stop means for limiting the movement of shaft 91 toward the left and thus limit the upper speed at which the device may be adjusted to be in equilibrium. In this manner the possibility of its being adjusted by an irresponsible driver to function at unsafe limits can be avoided.

If all automotive vehicles were required to be equipped with the device of my invention, the adjustment of regulating spring 98 could be achieved remotely by well known electronic means to automatically limit the speed of traffic flow through zones where reduced speed is desirable such as for instance in school zones. Universal use of my device on vehicles travelling on multiple lane divided highways will also serve to eliminate the hazardous condition which frequently occurs when drivers of vehicles in adjacent traffic lanes unconsciously tend to synchronize their driving speeds when close enough for comparison and thus to block the access of another driver who wishes to pass them, or place themselves in a mutual relationship which would prove dangerous in the event that an unforeseen hazard suddenly appeared in the path of such a group of moving vehicles.

*Alternative embodiment*

Figure 2:
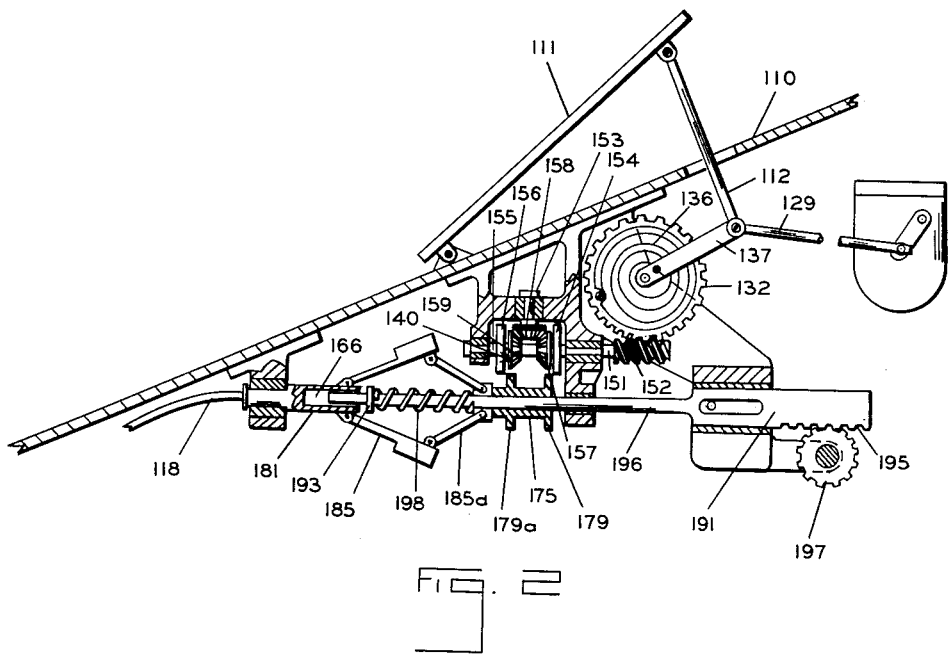
Fig. 2 is a side view similar to Fig. 1 showing a second embodiment of the invention similarly employed.

In the embodiment of my invention shown in Fig. 2, I provide a speedometer cable 118 connected to drive a governor shaft 181 to which there are connected a plurality of weighted centrifugal lever arms 185. The arms 185 are pivotally connected by pivoted links 185a with a drive sleeve 175 which is rotatably mounted on arbor 196 which extends through the hollow of the sleeve. The arbor 196 is formed as an extension of an adjusting shaft 191. One end of arbor 196 (left as seen in Fig. 2) extends into a central bore 166 formed in the adjacent end of governor shaft 181. Adjacent to the bore 166, the arbor 196 is formed with a shoulder or bearing plate 193. Interposed between bearing plate 193 and the nearer end of drive sleeve 175 is a spring 198 which urges the sleeve 175 to the right (as seen in Fig. 2) on arbor 196. Adjusting shaft 191 is formed with a rack portion 195 with which there is engaged a pinion gear 197. Cable 118, shaft 181, arbor 196 and shaft 191 are all mounted in suitable bearings and have their axes in alignment with each other. The gear 197 is connected by a suitable flexible shaft with control means located preferably on the instrument panel of the automobile so that gear 197 may be rotated by the driver thereof to adjust the speed limit of the automobile in a manner later to be described.

The drive sleeve 175 is arranged, as is evident from the above description, to be driven by the rotation of the speedometer cable 118. The said drive sleeve 175 is arranged to drive a worm shaft 151. To this end it is provided with circular drive wheels 179 and 179a. The direction of the drive of worm shaft 151 depends on the position of the drive shaft 175 longitudinally of the arbor 196 and that position depends on the speed of rotation of the governor shaft 181. The faster such rotation is the farther outward arms 185 are thrown by centrifugal force and consequently the more to the left (in Fig. 2) the drive sleeve 175 is forced.

When the vehicle is travelling substantially at the predetermined speed, the upward pressure of spring 136 is in equilibrium with the normal downward pressure exerted by the driver on pedal 111. If the vehicle is travelling at a speed substantially less than the speed limit for which the device is set, the flange 179 is aligned as shown with a wheel 154 secured to shaft 151. The sleeve 175 and its wheels, together with driven wheels 154 and 156, comprise multipole permanent magnets and the driven wheel 154 is caused to turn by magnetic force.

The shaft 151 carries a worm 152 which meshes with a spring gear 132. The spring gear 132 is secured to one end of a spiral spring 136 which has its opposite end secured to a spring lever 137. The spring lever 137 is pivoted at the center of spring gear 136 which is also the center of spring gear 132. The opposite end of spring lever 137 is pivotally connected to an accelerator push rod 112 and thus when the spring has been wound up exerts an upward force on push rod 112. The upper end of push rod 112 is connected to accelerator pedal 111 which is itself pivotally mounted on floorboard 110 of the automotive vehicle. Suitable stop means are provided to prevent the spring 136 from becoming wound too tightly or from becoming completely unwound. The push rod 112 is connected to the carburetor or other speed control device (not shown) by suitable means. For example, a link 129 may be connected as shown to the pivotal connection between spring lever 137 and push rod 112 and have its opposite end connected to the carburetor control lever.

When the speed of the vehicle increases above the speed for which the device is set, the arms 185 are thrown out by centrifugal force.

The circular drive wheel 179a is arranged at times (as for example when the vehicle is travelling faster than the speed for which the device is set) to be aligned with and to drive by magnetic force a circular wheel 156 mounted on a gear shaft 155. The drive between wheels 179 and 154 and the drive between wheels 179a and wheel 156 may (instead of the magnetic drive described) be a friction drive or the wheels may be cut as gear wheels to provide a more positive drive. I prefer however to use a magnetic drive.

When the wheel 179a is driving wheel 156 it drives the shaft 151 through a differential gear means 140. The differential gear means includes a bevel gear 157 secured to shaft 151, an idler gear 158 mounted on an idler shaft 153 and a reverse bevel gear 159 secured to gear shaft 155.

Operation

When the automobile is travelling at a speed substantially below that for which the limit is set, the parts are in the position shown. The cable 118 drives shaft 181 in a counter-clockwise direction (viewed from the left in Fig. 2) and through the arms 185 and links 185a drives the drive sleeve 175. The wheel 179 drives the wheel 154 and through it drives the shaft 151 and the worm 152 in a clockwise direction. The worm 152 thus drives the spring gear 132 moving the end of spring 136 which is attached to the spring gear 132 in a clockwise direction. This unwinds the spring 136 to the limit of the stop, and relieves the upward pressure thereof on the push rod 112 and the accelerator pedal 111. The operator operates the pedal 111 without interference and controls the carburetor by said pedal through rod 112 and link 129 in the well known manner. If the speed is increased so that it approaches the limit speed, the arms 185 are thrown out further drawing drive sleeve 175 to the left (in Fig. 2). While the wheels 179 and 179a are intermediate wheels 154 and 156 and while each is overlapping its cooperating wheel an approximately equal distance no driving force is exerted on the shaft 151. However, when the wheel 179a becomes aligned with the wheel 156 it turns the shaft 155 in clockwise direction and through the differential gear means 140 drives the shaft 151 in a counter-clockwise direction. This through worm 152 turns the spring gear 132 in a counter-clockwise direction and winding up the spring 136 until it reaches its stop. Thus winding up of the spring 136 exerts an upward force on the pedal 111 and opposing any tendency the driver may have to drive the car at a speed above that for which the device is set. If it is desired to adjust the limit speed, the gear 197 is rotated through its flexible shaft which moves the shaft 191 and the arbor 196 to the right or left. This moves the bearing plate 193 to the right or left increasing or decreasing the pressure on the spring 198. If the plate 193 is moved to the right for instance, it compresses the spring moving the drive sleeve 175 to the right and opposing the tendency of the arms 185 to move outward. This obviously increases the maximum speed for which the device is set inasmuch as a greater speed is required to move the arms 185 out and to move the wheel 179a into register with the wheel 156.

Second alternative embodiment

In Figs. 3 and 4, I have shown another embodiment of my invention. Therein a speedometer cable 218 is aligned with and connected to drive a governor shaft 281. The governor shaft 281 carries centrifugal lever arms 285 having cams 288. Aligned with the governor shaft 281 is a magnet drive shaft 261 having one end splined to the governor shaft as at 268 to be driven thereby while remaining free to move longitudinally relative thereto. The shaft 261 has circular flanged portion 263 on which the cams 288 bear. Aligned with shaft 261 at the opposite end thereof from the shaft 281 is a speed adjusting shaft 291 which has a reduced stem 296 formed in the shaft 261. The stem 296 carries a spring 298 which bears at one end on the enlarged portion of shaft 291 and at the opposite end on shaft 261 which may at its adjacent end carry bearing plate 293 on which the spring 298 actually bears.

The shaft 261 carries a magnet 270 which is secured thereto to rotate therewith. Sleeved on the shaft 261 so as to rotate freely thereon is a sleeve 277 which carries an inductor drum 275 and a gear wheel 279. Meshing with the gear wheel 279 is a gear 254 which, as shown most clearly in Fig. 4, is secured to a lever 237. Gear 254 is mounted on brackets 221. The outer end of lever 237 is connected by a ball and socket joint 239 with a push rod 212. In turn, the opposite end of the push rod 212 is connected by a ball and socket joint 213 with the accelerator pedal 211 which is mounted on the floorboard 210. The outer end of the lever 237 is connected by a link as shown in Fig. 4 with the carburetor. Connected to the floorboard 210 is a spring 236 which is connected at its opposite end to the lever 237. The shaft 291 is formed with a rack portion 295 with which there meshes a pinion gear 297 driven by a flexible shaft from a control (not shown) preferably located on the instrument panel of the vehicle.

Operation

The speedometer drive 218 drives the governor shaft 281 in a counter-clockwise direction (looking from the left in Fig. 3).

This drives the magnet drive shaft 261 through the spline connection 268 and thus rotates the magnet 270. So long as the speed is below the limit set the parts remain in the position shown. However, if the speed exceeds said limits, the centrifugal lever arms 285 are thrown out by centrifugal force and the cams 288 act on the flange 263 and move the shaft 261 to the right thus moving the magnet 270 into the inductor drum 275. This tends to turn the drum and thereby tends to turn the gear 279 counter-clockwise (viewed from the left in Fig. 3) and the gear 254 (clockwise viewed from the left in Fig. 3 or counter-clockwise as shown in Fig. 4). This imposes a magnetic force urging push rod 212 upwardly and opposing operation of the pedal 211 downward until such time as the speed drops below the maximum for which the device is set. The maximum speed is set by gear 297 and shaft 291 in the manner previously described to impose greater or lesser force on spring 298 opposing the operation of governor arms 285. It may be noted that the embodiments of my invention shown in Figs. 1 and 2 are subject to an operational lag between the actual occurrence of a vehicular speed in excess of the adjusted rate and the reaction of levers 37 and 137. The embodiment of Fig. 3 eliminates such lag in reaction by eliminating the variable spring element.

It is to be understood that the above described embodiments of my invention are for the purpose of illustration only and various changes may be made therein without departing from the spirit and scope of the invention.

I claim:

1. A speed regulating device for a vehicle having a drive shaft comprising speed controlling means; means comprising a magnetic clutch element, a lever, and mechanical connections between said magnetic clutch element and said lever for at times imposing upon said controlling means a reaction force; a governor shaft driven by said drive shaft; a governor driven by said governor shaft; a second magnetic clutch element driven by said governor shaft; and means controlled by said governor for connecting said clutch element when said vehicle attains a preselected speed whereby said reaction force is varied directly with changes of speed of said vehicle.

2. A speed regulating device for a vehicle comprising speed controlling means; a lever for adjusting said speed controlling means; means comprising an inductor drum clutch element and connections between said clutch element and said lever for urging said lever toward a position in which the speed of the vehicle is retarded by said speed controlling means; a shaft driven at a fixed ratio relative to the speed of said vehicle; and means comprising a governor driven by said shaft and a second permanent magnet clutch element driven by said shaft and movable into effective connection with said first named clutch element by said governor for changing said urging force in response to various vehicular speeds.

3. A device for regulating the speed of an automotive vehicle comprising a throttle for said automotive vehicle; centrifugal governor means driven by said vehicle; magnetic means rotated by said governor and at times axially repositioned thereby; inductor drum means positioned adjacent to and magnetically driven at times by said magnetic means when said magnetic means has been axially repositioned relative thereto; throttle reaction spring means in biasing engagement with said throttle; and means including said drum means when magnetically driven for varying the biasing force of said spring means.

4. A speed regulating device for a vehicle comprising speed control means; a lever for operating said speed control means; a shaft driven at a fixed ratio relative to the speed of said vehicle; means comprising an inductor drum clutch element and connections between said clutch element and said lever for imposing a reaction force on said lever; and means comprising a governor driven by said shaft and a second permanent magnet clutch element driven by said shaft and movable into effective connection with said first named inductor drum clutch element by said governor for coupling said driven shaft to said reaction imposing means to make said reaction imposing means effective when the speed of the vehicle exceeds a predetermined maximum speed.

5. A throttle regulating device comprising an automotive vehicle; a throttle therefor; variable reaction spring means for urging said throttle toward a retarded position; a plurality of inductor drum means geared to said spring means for varying the output force of said spring means; permanent magnet means rotatable at times in driving relationship with one or the other of said drum means; centrifugal governor means rotatably driven by said machine and connected to said magnet means for rotating said magnet means and for at times repositioning said magnet means in driving relationship with one or another of said drum means; and means for adjusting said governor for repositioning said magnet when said governor is rotated at a predetermined rate.

6. A speed regulating device for a vehicle comprising means for controlling the speed of said vehicle; a lever connected to said controlling means; a spring connected at one of its ends to said lever for imposing a biasing force upon said lever; a spring gear connected to the opposite end of said spring; a shaft driven at a fixed ratio relative to the speed of said vehicle; means driven by said shaft and comprising a governor for coupling said driven shaft to said spring gear; a rotating magnet driven by said governor and axially repositioned thereby to a plurality of magnet positions when the angular velocity of said governor is changed; drum means at times magnetically driven by said magnet and comprising a plurality of inductor drums, each of said drums being disposed about one of said magnet positions; and torque transmitting means connected to said drum means and driven thereby, and connected to said spring gear means for at times increasing and at other times decreasing the magnitude of said biasing force depending on the speed of said vehicle.

7. A speed regulating device for a vehicle comprising means for controlling the speed of said vehicle; a lever connected to said controlling means; a spring connected at one of its ends to said lever for imposing a biasing force upon said lever; a spring gear connected to the opposite end of said spring; a shaft driven at a fixed ratio relative to the speed of said vehicle; and means driven by said shaft for coupling said shaft to said spring gear and comprising a governor, at least one magnetic drive gear driven by said governor and axially repositioned thereby to a plurality of driving positions when the angular velocity of said governor is changed, and a torque transmitting device driven by said magnetic gear for at times increasing and at other times decreasing the magnitude of said biasing force depending on the axial position of said magnetic drive gear.

8. A speed regulating device for a vehicle comprising means for controlling the speed of said vehicle; a lever connected to said controlling means; a spring connected to said lever for imposing a biasing force of fixed magnitude upon said lever; a shaft driven at a fixed ratio relative to the speed of said vehicle; and means driven by said shaft for coupling said shaft to said lever and comprising a governor, a rotating magnet driven by said governor and axially repositioned thereby to a plurality of magnet positions when the angular velocity of said governor is changed, an inductor drum at times magnetically driven by said magnet and disposed about one of said magnet positions, and a torque transmitting device driven by said drum means for at times rotating said lever for supplementing said biasing force.

9. In an automotive vehicle, a throttle regulating device comprising a throttle; accelerator means for controlling said throttle; a spring lever rotatable about an axis adjacent one of its ends and pivotally secured at its opposite end to said accelerator means for transmitting a biasing force thereto; a spiral spring disposed concentrically about said axis, secured at one end to said lever for imposing said biasing force upon said lever; a spring gear rotatable about said axis and secured to the opposite end of said spring for changing the magnitude of said biasing force; a magnet drive shaft having a circumferentially disposed terminal flange adjacent one of its ends, said flanged end being further formed with an axially projecting arbor and the opposite end of said drive shaft being formed with a blind axial bore; a permanent magnet centrally disposed along said magnet drive shaft and fixedly secured thereto, said magnet having a plurality of pole pieces projecting radially from said magnet drive shaft; a plurality of sleeves slidably rotatable upon said magnet drive shaft on opposite sides of said magnet; a plurality of inductor drums of cylindrical configuration having an inside radius greater than the radial length of said pole pieces, each of said drums being open at one end, substantially closed at its opposite end and secured with said closed end in fixed annular engagement with one of said sleeves; a plurality of drum gears, each being concentrically disposed about and secured to one of said sleeves; torque transmitting means connected to said drum gears for being driven alternatively thereby and connected to said spring gear for at times rotating said gear in one direction and at other times rotating said gear in the opposite direction depending on the speed of the vehicle; a governor shaft with an axial bore in one end for slidably receiving said axial arbor in splined engagement for securing said magnet drive shaft against rotation independent of said governor shaft and for permitting said arbor to be longitudinally slidable within said axial bore; a plurality of centrifugal lever arms radially disposed about said governor shaft and pivotally secured thereto; a plurality of cams formed integrally with said centrifugal lever arms for at times cooperatively engaging said circumferential flange; a spring arbor having one end slidably retained in splined engagement with said axial bore of said magnet shaft and having a rack adjacent its opposite end; an annular bearing plate rotatably secured upon said spring arbor adjacent the end of said magnet shaft; a helical compression spring bearing at its opposite ends upon said bearing plate and upon a shoulder of said spring arbor; a pinion gear rotatably secured adjacent said rack and meshed therewith; shaft means for manually rotating said pinion gear; speedometer cable means for rotating said governor at a rate in direct proportion to the rate of motion of said vehicle.

10. A speed regulating device for a vehicle comprising a throttle for controlling the speed of said vehicle; a lever connected to said throttle for transmitting a biasing force thereto; a spring connected at one of its ends to said lever for imposing a biasing force upon said lever; a spring gear connected to the opposite end of said spring for varying the force thereof; a shaft driven at a fixed ratio relative to the speed of said vehicle; means driven by said shaft and comprising a governor, for coupling said shaft to said spring gear said governor means having a plurality of radially disposed centrifugal levers pivotally secured thereto and a plurality of cams rotated by said levers; means comprising a plurality of magnetic drive gears driven by said governor and axially repositioned by said cams to a plurality of driving positions when the angular velocity of said governor is changed; torque transmitting means driven by said magnetic gear means and connected to said spring gear for rotating said gear in one direction in response to relatively high vehicular speeds and in the opposite direction in response to relatively low vehicular speeds; means comprising a spring for exerting a force in opposition to axial movements of said magnetic gears; and means comprising a rack and pinion for varying the magnitude of said opposing force and for regulating the speed at which said device is operable.

11. A speed regulating device for a vehicle comprising a throttle for controlling the speed of said vehicle; a lever connected to said throttle for transmitting a biasing force thereto; a spring connected to said lever for imposing a biasing force of fixed magnitude upon said lever; a shaft driven at a fixed ratio relative to the speed of said vehicle; means driven by said shaft and comprising a centrifugal governor for coupling said shaft to said lever, said governor means having a plurality of radially disposed centrifugal levers pivotally secured thereto and a plurality of cams rotated by said levers; a rotating magnet driven by said governor and at times axially repositioned by said cams to a plurality of magnet positions when the angular velocity of said governor is changed; means at times magnetically driven by said magnet and comprising an inductor drum disposed about one of said magnet positions; a plurality of gears rotated by said drum means for at times rotating said lever imposing an additional supplementary biasing force upon said lever when said vehicle is travelling at relatively high speeds; means comprising a spring for exerting a force in opposition to axial movement of said magnet means; and means comprising a rack and pinion for varying the magnitude of said opposing force and for regulating the speed at which said device is operable.

12. A speed regulating device for a vehicle comprising means for controlling the speed of said vehicle; a lever connected to said control device; a spring connected to said lever for imposing a biasing force of fixed magnitude upon said lever; a shaft driven at a fixed ratio relative to the speed of said vehicle; a centrifugal governor having a plurality of radially disposed centrifugal levers pivotally secured thereto and having a plurality of cams rotated by said levers; a rotatable magnet driven by said governor and at times axially positioned by said cams to a plurality of magnet positions when the angular velocity of said governor is changed; an inductor drum disposed about one of said magnet positions; and means comprising a gear rotated by said drum for at times imposing an additional supplementary biasing force upon said lever when said vehicle is travelling at relatively high speeds.

13. A speed regulating device for a vehicle comprising means for controlling the speed of said vehicle; a lever connected to said control device; a spring connected to said lever for imposing a biasing force of fixed magnitude upon said lever; a shaft driven at a fixed ratio relative to the speed of said vehicle; a centrifugal governor having a plurality of radially disposed centrifugal levers pivotally secured thereto and having a plurality of cams rotated by said levers; a rotatable magnet driven by said governor and at times axially positioned by said cams to a plurality of magnet positions when the angular velocity of said governor is changed; an inductor drum disposed about one of said magnet positions; means comprising a gear rotated by said drum for at times imposing an additional supplementary biasing force upon said lever when said vehicle is travelling at relatively high speeds; means comprising a spring for exerting a force in opposition to axial movement of said magnet means; and means comprising a rack and pinion for varying the magnitude of said force in opposition, and for regulating the maximum speed for which said speed regulating device is set.

14. A speed regulating device for a vehicle comprising a shaft driven by said vehicle at a rate in proportion to the speed of said vehicle; speed control means for said vehicle; a throttle pedal lever for operating said speed control means; means connecting said shaft and said lever and supplying power from said shaft to said lever to urge said lever in a direction to move the speed controlling means so as to retard the speed of the vehicle and comprising a governor, a pair of magnetic clutch elements one of which is connected to said shaft and one of which is connected to said lever, and one of which is an inductor drum and the other of which is a permanent magnet, and means operated by said governor for controlling the connection of said clutch elements with each other whereby the connection between said shaft and said lever is inoperative until said vehicle attains a predetermined speed and become operative to impose a reaction force upon said lever tending to retard the speed of the vehicle when the speed of the vehicle exceeds a predetermined maximum of speed.

References Cited in the file of this patent

UNITED STATES PATENTS

| | | |
|---|---|---|
| 2,127,454 | Wolfe et al. | Aug. 16, 1938 |
| 2,225,206 | Cassels | Dec. 17, 1940 |
| 2,519,859 | Teetor | Aug. 22, 1950 |
| 2,816,617 | Lee | Dec. 17, 1957 |

FOREIGN PATENTS

| | | |
|---|---|---|
| 891,458 | France | Dec. 11, 1943 |
| 494,174 | Great Britain | Oct. 21, 1938 |